United States Patent [19]

Hosaka et al.

[11] 4,329,398
[45] May 11, 1982

[54] MAGNETIC RECORDING MEDIUM

[75] Inventors: Akihiko Hosaka; Kazushi Tanaka, both of Saku, Japan

[73] Assignee: TDK Electronics Co., Ltd., Tokyo, Japan

[21] Appl. No.: 95,648

[22] Filed: Nov. 19, 1979

[30] Foreign Application Priority Data

Nov. 24, 1978 [JP] Japan ................................ 53/144286

[51] Int. Cl.$^3$ .............................................. G11B 5/68
[52] U.S. Cl. ................................ 428/413; 252/62.54; 360/134; 427/128; 428/425.9; 428/483; 428/522; 428/694; 428/900
[58] Field of Search .................... 428/900, 413, 425.9, 428/483, 522, 694, 695; 252/62.54; 427/127, 128; 360/134, 135, 136

[56] References Cited

U.S. PATENT DOCUMENTS

| 3,247,017 | 4/1966 | Eichler et al. | 428/900 |
| 3,320,090 | 5/1967 | Graubart | 428/900 |
| 3,650,828 | 3/1972 | Higaohi et al. | 252/62.54 |
| 3,689,317 | 9/1972 | Akashi et al. | 428/900 |
| 3,740,266 | 6/1973 | Akashi et al. | 428/900 |
| 3,840,400 | 10/1974 | Yamada et al. | 428/900 |
| 3,911,196 | 10/1975 | Navidad | 428/425.9 |

FOREIGN PATENT DOCUMENTS

| 53-11443 | 4/1978 | Japan | 427/128 |
| 55-5176 | 2/1980 | Japan | 427/128 |
| 661600 | 5/1979 | U.S.S.R. | 428/900 |

Primary Examiner—Stanley S. Silverman
Attorney, Agent, or Firm—Wyatt, Gerber, Shoup, Scobey & Badie

[57] ABSTRACT

A magnetic recording medium consisting of a base coated with a magnetic coating material, characterized in that the binder composition in said magnetic coating material is ternary, consisting of from 30 to 70% of a polyurethane resin having an —OH group in the terminal position, from 10 to 50% of an epoxy resin, and from 10 to 50% of a vinyl chloride-vinylidene chloride copolymer, all by weight on the basis of the total weight of the binder together with a curing agent. The magnetic recording medium exhibits superior electromagnetic properties and physical properties such as stability on repeated runs and bonding strength of the coating.

4 Claims, 1 Drawing Figure

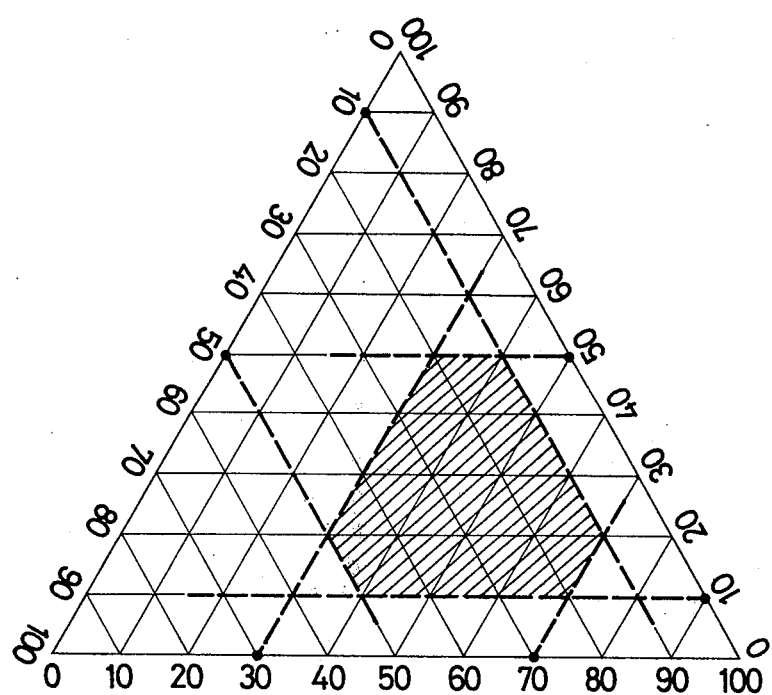

MAGNETIC RECORDING MEDIUM

BACKGROUND OF THE INVENTION

This invention relates to a magnetic recording medium.

Today the magnetic recording medium in varied forms commonly consists of a backing material coated with a mixture of magnetic powder and binder.

For that purpose a variety of binders have hitherto been proposed, but none have yet been described which permit the resulting medium sufficiently to meet both of two major requirements of such media, namely acceptable electromagnetic conversion characteristic and physical properties such as stability on repeated runs and bonding strength of the coating.

The binders thus far employed have in large measure been urethanes, vinyl chloride-vinyl acetate copolymers, cellulose plastics, and epoxy resins, principally combinations of two such components. The deficiency common to the binary binders has been their inability to provide a medium which meets the two above described requirements in a satisfactory manner.

The magnetic coating on a recording medium is abraded as the medium is repeatedly drawn past the magnetic head, with the coating in sliding contact with the head. Because of its effectiveness in increasing the resistance of the coating to this wearing action, vinyl chloride-vinylidene chloride copolymers, are presently favored. However, coating materials utilizing such copolymers manifest the disadvantages of gelation and embrittlement of the coated film with time. To improve the coated film quality, mixing the copolymer with an epoxy resin and a isocyanate terminated polyurethane resin was proposed (Japanese patent application Public Disclosure No. 160013/1975). The proposal makes use of the cross linking by the reaction of the —OH group of the epoxy resin with the isocyanate group (—NCO). The use of this ternary binder has somewhat improved abrasion resistance, but the products are not completely satisfactory. (The numerical values of wear resistance, i.e., of repeated running stability, tabulated in the published specification are much lower than those of the present invention as will be seen hereinafter.)

BRIEF SUMMARY OF THE INVENTION

The present invention has for its object the provision of a magnetic recording medium improved in the electromagnetic conversion characteristic, a property which is the most important and essential of the requirements for a medium of this character, in long term running stability which is typical of the physical properties required, and in bonding strength and other properties, without impairing the usually antagonistic property of surface smoothness.

The present invention pertains to improvements in magnetic recording medium by providing magnetic coatings which have a ternary binder composition consisting of a polyurethane resin, an epoxy resin, and a vinyl chloride-vinylidene chloride copolymer, which overcomes the afore-mentioned shortcomings of the known ternary system.

More particularly, the present invention provides a magnetic recording medium consisting of a base coated with a magnetic coating material, characterized in that the binder composition in said magnetic coating material is ternary, consisting of from 30 to 70% of a polyurethane resin having an —OH group in the terminal position, from 10 to 50% of an epoxy resin, and from 10 to 50% of a vinyl chloride vinylidene chloride copolymer, all by weight on the basis of the total weight of the binder.

The present invention will be fully described in the following, making reference to the accompanying drawing and examples.

BRIEF DESCRIPTION OF THE DRAWING

FIG. 1 is a ternary binder composition diagram, the shaded portion of which shows the range of the composition according to the present invention.

DETAILED EXPLANATION OF THE INVENTION

The polyurethane resin employed in this invention must have an —OH group in the terminal position. Typical of such polyurethane resins which are commercially available and useful are Nippon Polyurethane Industry Company's "Nippollan 5033", "Nippollan 3022", and "Nippollan 5032" and B. F. Goodrich Chemical Company's "Estane 5702" and "Estane 5703" (all trademarks).

Useful epoxy resins are Shell Chemical Company's "Epilote 1004", "Epikote 1007", and "Epikote 1009" (all trademarks).

As represented by the hatched region in the diagram of FIG. 1, the proportions of the components in the binder composition according to the invention are desirably from 30 to 70% of the polyurethane resin, from 10 to 50% of the epoxy resin, and from 10 to 50% of the vinyl chloride-vinylidene chloride copolymer, all by weight. If the proportion of the polyurethane resin is less than 30%, an insufficient bonding strength will result. If it exceeds 70%, the bonding strength will increase but the long term running stability of the medium will be adversely affected, with squealing or sticking to the head. If the epoxy resin accounts for less than 10%, the binder composition will give a coating with a poor surface quality and an inadequate electromagnetic conversion characteristic. Conversely if it accounts for more than 50%, a difference in shrinkage rate between the base and the coating layer will result in curling or warping, although the bonding strength will increase.

With less than 10% of the vinyl chloride-vinylidene chloride copolymer, the bonding strength and electromagnetic conversion characteristic will improve but only at the cost of inferior long term stability. If the proportion of the copolymer is more than 50%, the bonding property of the binder will be unfavorably affected. Moreover, the long term running stability of the resulting medium will rapidly decrease at elevated temperatures.

In accordance with this invention, the advantages of such ternary binders are realized by providing magnetic recording medium in which the the binder-containing magnetic coating material of this invention is mounted on a base.

The magnetic recording tape made in this way is excellent in both electromagnetic conversion characteristic and other physical properties.

In accordance with this invention the long term stability of the product is eminently improved without adversely effecting other properties. In terms of numerical values (which will be given in detail later), the medium according to the invention is capable of standing up to 1,400 runs as compared with, at most, about 400 runs mentioned in the specification of the above-cited patent application.

The invention is illustrated by the following examples.

EXAMPLES

A composition consisting of

| | |
|---|---|
| $\gamma$-Fe$_2$O$_3$ (cobalt-doped) | 400 parts by weight |
| Dispersant | 6 parts by weight |
| Polyurethane resin ("Nippollan 5033" marketed by Nippon Polyurethane Ind.) | 60 parts by weight |
| Epoxy resin "Epikote 1009" by Shell Chemical) | 25 parts by weight |
| Vinyl chloride-vinylidene chloride resin ("#1000 WK" by Denki Kagaku Kogyo) | 15 parts by weight |
| Lubricant | 5 parts by weight |
| Methyl ethyl ketone | 500 parts by weight |
| Methyl isobutyl ketone | 200 parts by weight |
| Cyclohexanone | 200 parts by weight | was thoroughly mixed and dispersed in a ball mill and, with the addition of 15 parts by weight of a polyisocyanate ("Desmodur L" marketed by Bayer) as a curing agent, the whole mixture was made uniform by mixing and agitation to prepare a coating solution. It was then applied on a 12μ-thick polyester film to form a coating layer 6μ in thickness, surface processed by super calendering, and hardened by heating at 60° C. for 48 hours. The coated film was slitted to magnetic tape 3.81 mm in width.

The magnetic audio tape thus obtained was tested for its bonding strength, repeated running stability, electromagnetic conversion characteristic, surface gloss, and other properties. The results are given as those of Test piece I in the table carried below. In a similar way, different magnetic tapes were made of the same coating material except that the binder composition was varied. They were tested in the same way and the results are also tabulated as those of Test pieces A to H.

For the purposes of the invention the term "bonding strength" is defined to be the strength required to peel the magnetic coating and the base film 180 degrees apart, in grams per ⅛ in. of width of the test tape. The "electromagnetic conversion characteristic" and "gloss" (as measured by a glossmeter "GH-5" made by Murakami Colors) are indicated as relative values based on the values of Test piece I which are both zero decibel.

As will be seen from the following table, magnetic tapes B, C, and I which conform to this invention are excellent in bonding strength, repeated running stability, electromagnetic conversion characteristic, gloss and other properties. Generally, they are magnetic tapes with outstanding properties. The tapes A, D, E, F, G, and H by contrast, have general properties which make them difficult to use in practice because their individually excellent properties are offset by one or more deficiencies another.

The amount of the curing agent to be added is desirably between 8 and 20 parts by weight on the basis of the weight of the binder. With less than 8 parts by weight of the agent, almost no cross-linking effect will be expected. More than 20 parts by weight of the agent will lessen the bonding strength of the coating relative to the base film.

As described above, the magnetic recording mediums according to the present invention are collectively superior to conventional ones using known binder systems, in properties such as long term running stability, bonding strength, electromagnetic conversion characteristic, and gloss.

TABLE

| | Binder composition | | | | Properties | | |
|---|---|---|---|---|---|---|---|
| Test piece | Poly-ure-thane | Epoxy resin | PV-PVdC | Bond str (g) | Long term runng stabty (No. of runs) | Electro-mag conv chrac 10 KHz(dB) | Gloss (dB) |
| A | 10 | 20 | 70 | 3 | 900 | + 0.4 | + 1.1 |
| B | 60 | 10 | 30 | 28 | 1400 | + 0.2 | + 0.5 |
| C | 40 | 40 | 20 | 30 | 1250 | 0 | − 0.2 |
| D | 50 | 45 | 5 | 35 | 250 | − 0.4 | − 0.8 |
| E | 65 | 35 | — | 130 | 100 | − 0.2 | − 0.5 |
| F | 35 | 65 | — | 115 | 120 | − 2.0 | − 2.5 |
| G | 70 | — | 30 | 63 | 250 | − 0.5 | − 1.0 |
| H | 40 | — | 60 | 10 | 450 | − 0.1 | − 0.3 |
| I | 60 | 25 | 15 | 35 | 1200 | 0 | 0 |

What we claim is:

1. A magnetic recording medium consisting of a base coated with a magnetic coating material containing a magnetic powder and a binder composition therefor, characterized in that the binder composition in said magnetic coating material is ternary, consisting of from 30 to 70% of a polyurethane resin having an —OH group in the terminal position, from 10 to 50% of an epoxy resin, and from 10 to 50% of a vinyl chloride-vinylidene chloride copolymer, all by weight on the basis of the total weight of the binder together with a polyisocyanate curing agent.

2. A magnetic recording medium according to claim 1, wherein said curing agent is from 8 to 20 parts polyisocyanate based on the weight of binder.

3. A magnetic recording medium according to claim 1, or 2, wherein said base is a polyester film.

4. A magnetic recording medium according to claim 3, wherein said polyester film is in the form of a tape.

* * * * *